ced Sept. 8, 1964

3,148,121
WATER-INSOLUBLE WHOLE INHALANT COMPLEX AND METHOD OF MAKING SAME
Margaret B. Strauss, New York, N.Y., assignor to Miles Laboratories, Inc., Elkhart, Ind., a corporation of Indiana
No Drawing. Filed Jan. 27, 1960, Ser. No. 4,894
14 Claims. (Cl. 167—78)

The present invention relates to prophylactic and therapeutic treatments of allergies, and more particularly to processes for producing allergenic inhalant extracts, and the antigenic compositions thus produced.

It is well known that many materials serve as the source of principles, the precise nature and the chemical composition of which are not as yet fully understood, which display a high degree of physiological activity, and which are capable of producing certain forms of the allergy syndrome in sensitive individuals. These principles are commonly known as allergens.

The present invention relates to allergens which produce allergic reactions, such as asthma or hay-fever, and is quite generally applicable to inhalants, such as dusts, epithelials, seeds, insects, and pollens.

Numerous attempts have been made in the past at using inhalants in the therapeutic treatment of existing allergic states, and in the prophylaxis of allergies by eliciting an immunologic response, whereby to forestall or at least minimize the effects of an actuate attack. In the course of these investigations, a large variety of extracts containing, or believed to contain, all or at least the major part of the active components, were tested, and some of these were marketed.

Most inhalants contain considerable quantities of water-immiscible oil. Because of the presence of this water-immiscible oil, extraction of the whole inhalant material with aqueous extracting fluids results in turbid solutions. Doctors object to turbid solutions, as they are not readily distinguished from contaminated preparations. Therefore, it was suggested at an early stage of allergy research that the oily substances be removed with ether, and defatting of the inhalant prior to extraction has been adopted as a standard procedure in this field.

The adoption of this procedure is difficult to explain considering the work done by certain investigators, who established, as early as 1930, that there is an allergenically active constituent in the oil or fat fraction of inhalant material. Consequently, the usual defatting and dehydrating procedure preceding aqueous extraction eliminates the active oil fraction. Seeing that none of the great variety of inhalant extracts proposed, and to some extent marketed over the years, proved entirely satisfactory for purposes of therapy and prophylaxis, it should have seemed logical to pursue the investigations in the direction of utilizing the whole inhalant material, including the fatty component, while abstaining from any treatment of the material which might harm or transform any active component thereof, but this was not done until the present invention was conceived. This failure no doubt was caused by a number of factors, the principal one, most likely, being the absence of any agent whereby an extract could be prepared from the whole inhalant without giving a murky solution which rapidly turned oily with a gummy residue, and without a danger of introducing into the extract toxic or otherwise undersirable components apt to result in harmful side effects.

It is a principal object of the present invention to fill this gap left by the prior art, and to provide a method and a composition, whereby the whole inhalant material is utilized for the purpose of preparing an extract for therapeutic and prophylactic use in the treatment of allergies.

It is a further object of this invention to prepare allergenic extracts from inhalants, such as dusts, epithelials, seeds, insects, and pollens.

It is another important object of this invention to prepare whole inhalant extracts in a form lending itself to simple standardization and easy administration even to very sensitive persons.

A still further object of the invention is the preparation of an allergenic inhalant extract distinguished by critically improved characteristics.

Yet another object of the present invention is the provision of an allergenic inhalant extract, whereby to eliminate itching of the eyes and nose, frequently a most irritating symptom of patients suffering from hay-fever and the like.

Other objects, and the manner in which the same are attained, will become apparent as this specification proceeds.

The present invention contemplates the preparation of an allergenically active product for use in the therapy or prophylaxis of allergic conditions by extracting the whole inhalant material with an extracting liquid containing a weak organic base, and more especially a heterocyclic tertiary amine, such as pyridine, lutidine, quinoline, or the like, and an aqueous medium. Plain distilled water may be used, but a saline solution containing e.g. about 0.3% sodium bicarbonate, or 0.9% sodium chloride, or 5% dextrose, or an N/10 sodium hydroxide solution, or a phosphate buffer pH 7.0, are preferred, the percentages, of course, being illustrative only. The weak organic base and the aqueous solution are preferably used in about equal parts.

In accordance with the basic principles underlying the present invention, it has been established that extracting liquids composed as outlined above succeed in extracting both any oil or fat fraction and any poteinaceous components, including water-soluble proteins, polypeptides and proteoses, from the whole inhalant material. While the precise mechanism is not yet fully understood, the oil fractions, as well as any water-insoluble proteinaceous fractions which may be present in the whole inhalant material, are likely to contain acidic terminal groups with which the weak tertiary base, such as pyridine, chemically reacts to form compounds either in the nature of quaternary, e.g. pyridinium salts or of link compounds; the pyridine or similar weak tertiary base may react with the dicarboxylic amino acids known to be present, in abundance, in all proteinaceous fractions, including the water-insoluble components which are closely associated with the oil or fat fractions of the whole inhalant material.

When 50% ethyl alcohol, 50% acetone, 50% glycerol or 37% resorcinol in aqueous solution were used to extract whole pollens, for example, the resultant extract was not precipitatable with potassium alum in any manner comparable with the effect of e.g. a 50% pyridine extract.

It is further within the purview of this invention to treat the whole inhalant extract prepared by extraction with a pyridine or the like containing extracting liquid, with alum or the like, to cause precipitation of an allergenically active water-insoluble inhalant complex.

The process according to the prsent invention is applicable to all inhalants, and particulraly, all inhalant materials known to satisfy the well-known criteria, such as presence of an asthma, hay-fever, or similar respiratory excitant, adequate if not abundant occurrence and airborne distribution. Among the materials successfully treated by the present process, and successfully converted into an allergenically active water-insoluble whole inhalant complex found effective in the prophylaxis and therapy of asthmas and hay-fever have been dusts, such as ordinary dust collected by vacuum cleaners in homes, and dust collected from various factories or shops, such as sweepings from wood furniture factories, furriers and baker's shops, etc.; epithelials, including cat, dog, rabbit and goat materials, and chicken, duck and goose feathers; seeds, such as cottonseed, and Kapok seed; insect material from yellow jackets, wasps, bees, hornets, mosquitoes and other stinging insects, and pollen of weeds, grasses, and trees, and more particularly high ragweed, low ragweed, plantain, timothy grass orchard grass, ash tree, beech tree, birch tree, elme tree, oak tree, hickory tree, poplar tree and maple tree.

The inhalant material may be extracted by the process of the present invention within a wide range of concentrations.

The extraction may proceed at room temperature or at ice box temperatures, with or without agitation. The extraction treatment yields a solution containing the reaction product of the weak tertiary base, such as pyridine with physiologically active allergenic principles of the inhalant, including the important oil fraction thereof.

The novel antigenic inhalant complexes according to the present invention are obtained by treatment with alum or the like. Thus, when e.g. 10 grams of residential dust have been allowed to extract with 100 ml. of an e.g. pyridine-carbonate solution e.g. for forty-eight hours, the extract is filtered off and subsequently sterilized, e.g. by Seitz-filtration. The 10 percent pyridine-bicarbonate dust extract is combined with an equal volume of sterile distilled water, and then the same quantity of a solution of sterile 2 percent potassium aluminum sulfate in ¼ N sulfuric acid is added slowly with mixing causing precipitation of an allergenically active water-insoluble dust complex.

The precipitate and solution may be allowed to stand, whereafter the mixture may be centrifuged and the supernatant fluid discarded. The residue may be washed repeatedly with sterile saline solution and the final volume of this suspension may be made up to a volume equal to one-half the initial volume of the 10 percent pyridine-bicarbonate dust extract used.

This product is substantially insoluble in water, exhibits antigenic activity of a very high order and is readily suspended in isotonic saline solution for administration by injection in the prophylactic and therapeutic treatment of asthma. The allergenic activity of the product is not materially affected by storage at room temperature even over long periods of time.

The present suspensions lend themselves to standardization by a weight method which takes into account all antigenic fractions present, including the oily fraction previously removed prior to the preparation of an aqueous extract.

The novel allergenic products according to this invention are non-toxic and are non-irritating, as established by a series of tests conducted as follows: 12 individuals (randomly selected), having no previous history of hypersensitivity, were administered subcutaneous injections of this product in various dilutions without any detectable, local or systemic reactions.

The stability of the novel antigenic products of this invention was demonstrated by tests upon rabbits, showing substantially undiminished activity of the present alum precipitated pyridine inhalant extracts after 3 years of storage at room temperature.

The present water-insoluble whole inhalant extracts are distinguished by a vastly decreased rate of absorption compared with the standard aqueous defatted extracts. This may be illustrated by reference to passive transfer tests which were performed on six suitable normal non-sensitive adults with ragweed-sensitive sera sites, using an ordinary aqueous ragweed extract and a novel water-insoluble whole grain ragweed extract according to this invention. The time interval and degree of reaction at the passive transfer sites were noted, and it was determined that there was a very material decrease (threefold or more) in the rate of absorption of the present product over the absorption of the ordinary aqueous ragweed extract.

The novel allergenic products according to this invention are non-toxic and non-irritating, and are materially more effective than the products heretofore available for the prophylactic and therapeutic treatment of asthma and hay-fever.

The methods and products according to the invention are illustrated by the following examples, but I wish it to be understood that these examples are intended to illustrate rather than limit the present invention.

*Example I*

Ten grams of ordinary vacuum cleaner residential dust were placed in a jar and covered with sufficient extracting liquid consisting of 50% pyridine and 50% aqueous solution containing phosphate buffer for pH 7.0, just to cover the antigenic mass but not in excess. This was allowed to extract, with occasional stirring, for 2 days at room temperature. The bulk of the dust was then removed by passage through a press or cheese cloth, and the extract was filtered off through regular filter paper, then Seitz-filtered for sterilization. Under sterile conditions, 40 ml. of the pyridine dust extract thus obtained were combined with 40 ml. of sterile distilled water, and to this mixture, 40 ml. of an 0.25 N sulfuric acid solution containing 2 percent by weight of sterile potassium aluminum sulfate were added slowly, with continuous agitation. The reaction product was obtained in the form of a voluminous precipitate, yellow to brown in color, which was an allergenically active water-insoluble dust complex. The precipitate and solution were allowed to stand overnight at 5° C., whereupon the mixture was centrifuged and the supernatant liquid was discarded. The residue was washed three times with large quantities of sterile saline solution, sterile glass beads being used to separate the finely divided particles of the precipitate and to facilitate washing. The precipitate was then suspended in isotonic solution, the final volume of this suspension being made up to a volume equal to one-half the initial volume of the pyridine dust extract used, thus affording a twofold concentration of the material. The suspension of this product in isotonic saline solution proved useful for administration by injection.

*Example II*

A dried cat skin was comminuted by cutting, or grinding in a ball mill or similar device. The material was collected without any preliminary washing or sterilizing which would cause the loss of some antigenic activity. This material was processed as in Example I and yielded a product similar to that described therein, which, when suspended in isotonic saline solution, was found useful for administration by injection.

*Example III*

Chicken feathers which had not been washed or sterilized, were ground in a ball mill or similar device. This material was processed as in Example I and yielded a product similar to that described therein, which when suspended in isotonic saline solution, was found useful for administration by injection.

*Example IV*

Cottonseeds which had not been defatted, or washed or sterilized, were ground in a ball mill. This material was processed as in Example I and yielded a product similar to that described therein, which, when suspended in isotonic saline solution, proved potent when administered by injection.

*Example V*

Yellow jackets were collected alive, frozen and kept in the deep freeze until ready for extraction. Without being washed or sterilized, 5 grams of this insect material were extracted in 100 cc. of an extracting fluid composed of 50% pyridine and 50% aqueous 0.3% sodium carbonate solution, and the resulting extract was then further processed as in Example I. When suspended in isotonic saline solution, the product proved useful for administration by injection.

When this example was repeated but dead, dried insects were used in the extraction, the antigenic activity of the complex appeared reduced.

*Example VI*

The procedure described in Example I was repeated with the exception that 12 grams of a mixture of equal parts of high ragweed and low ragweed pollen were extracted with 100 ml. of an extracting liquid composed of 50 ml. of quinoline and 50 ml. of aqueous 0.9% sodium chloride solution for 24 hours at room temperature. This extract was further processed as in Example I and yielded a product similar to that described therein, which, when suspended in isotonic saline solution, was found useful for administration by injection.

*Example VII*

The procedure described in Example I was repeated with the exception that 3 grams of a mixture of equal parts of high ragweed and low ragweed pollen were extracted with 100 ml. of an extracting liquid composed of 50 ml. of lutidine and 50 ml. of N/10 sodium hydroxide and solution, for 24 hours at room temperature. This extract was further processed as in Example I and yielded a product similar to that described therein, which, when suspended in isotonic saline solution, was found useful for administration by injection.

*Example VIII*

The procedure described in Example VII was repeated with the exception that 18 grams of a mixture of equal parts of high ragweed, low ragweed, timothy grass, orchard grass, beech tree and poplar tree pollen are substituted for the 3 grams of mixed ragweed pollen used therein. The final product was similar to and as useful as that described in Example VII, and had the manifest advantage of multiple immunization and therapy.

*Example IX*

The procedure described in Example I was repeated with the exception that 50 ml. of an aqueous solution containing 2 percent by weight of potassium alum were substituted for the 40 ml. of an 0.25 N sulfuric acid solution containing potassium alum, used therein. The final product was similar to and equally useful as that described in Example I.

*Example X*

The procedure described in Example III was repeated with the exception that 50 ml. of an aqueous solution containing 2 percent by weight of potassium alum were substituted for the 40 ml. of an 0.25 N sulfuric acid solution containing potassium alum, used therein. The final product was similar to and equally useful as that described in Example III.

*Example XI*

The procedure described in Example II was repeated with the exception that rabbit skin was substituted for the cat skin used therein, and that quinoline was substituted for pyridine in the extracting liquid. The final product was similar to and equally useful as that described in Example II.

*Example XII*

The procedure described in Example III was repeated with the exception that goose feathers were substituted for the chicken feathers used therein, and that lutidine was substituted for pyridine in the extracting liquid. The final product was similar to and equally useful as that described in Example III.

*Example XIII*

The procedure described in Example IV was repeated except that Kapok seeds were substituted for the cottonseeds described therein. The extract was further processed as in Example IV and yielded a product similar to that described therein, which, when suspended in isotonic saline solution, was found useful for administration by injection.

*Example XIV*

The procedure described in Example V was repeated with the exception that bees were substituted for the yellow jackets used therein. The final product was similar to and equally useful as that described in Example V.

I wish it to be understood that I do not desire to be limited to the exact details of substances, proportions and process conditions described and illustrated by way of example, as modifications within the scope of the following claims may occur to workers in this field which would involve no departure from the spirit of this invention nor any sacrifice of the advantages thereof.

Having thus described the present invention, what I desire to secure by Letters Patent is set forth in the following claims.

I claim:

1. A method of preparing a water-insoluble inhalant complex which comprises mixing the whole inhalant containing all sources of physiologically active principles including principally the proteinaceous fraction, the carbohydrate fraction and any fatty fraction present, with an extracting liquid containing about equal parts of a heterocyclic tertiary amine selected from the group consisting of pyridine, quinoline and lutidine, and an alkaline aqueous solution, to form a mixture with the active principles in said fractions, filtering the mixture thus obtained to recover the liquid extract containing the active material, adding water to this extract, mixing and adding a similar volume of an alum solution to precipitate a water-insoluble whole inhalant complex, and recovering the complex thus obtained, said complex being an allergenically active product containing all physiologically active principles of the inhalant.

2. A method of preparing a water-soluble inhalant complex which comprises extracting the entire inhalant material in a single extraction procedure, with an amount of about 5 to 10 parts by weight of inhalant to 100 parts by volume of about 50% aqueous heterocyclic tertiary amine selected from the group consisting of pyridine, quinoline, and lutidine, the aqueous component of said heterocyclic tertiary amine extracting liquid constituting a component selected from the group consisting of distilled water, 0.3% sodium bicarbonate solution, 0.9 sodium chloride solution, 5% dextrose solution, and N/10 sodium hydroxide solution, filtering the mixture thus obtained to recover the liquid extract containing the active material, adding an about equal volume of water, mixing and adding an about equal volume of an 0.25 N sulfuric acid solution containing about 2% by weight of potassium aluminum sulfate to precipitate the active material from the mixture, separating the precipitate, washing the precipitate and suspending the precipitate in an isotonic salt solution.

3. The method according to claim 1 wherein the liquid extract after filtration is sterilized.

4. The method according to claim 1, wherein the inhalant extracted is a dust.

5. The method according to claim 1, wherein the inhalant extracted is an epithelium.

6. The method according to claim 1, wherein the inhalant extracted is a mold.

7. The method according to claim 1, wherein the inhalant extracted is an insect material.

8. The method according to claim 1, wherein the inhalant extracted is a seed.
9. The product made by the method of claim 1.
10. The product made by the method of claim 4.
11. The product made by the method of claim 5.
12. The product made by the method of claim 6.
13. The product made by the method of claim 7.
14. The product made by the method of claim 8.

References Cited in the file of this patent

UNITED STATES PATENTS

| | | |
|---|---|---|
| 2,456,750 | Strauss | Dec. 21, 1948 |
| 3,071,508 | Strauss | Jan. 1, 1963 |

FOREIGN PATENTS

| | | |
|---|---|---|
| 527,803 | Great Britain | Oct. 16, 1940 |

OTHER REFERENCES

Sledge: U.S. Naval Med. Bulletin, January 1938, vol. 36, pp. 18–29.

Brown: The Journal-Lancet, 1937, pp. 97–100.

Brown: Review of Allergy and Applied Immunology, May 1957, pages 307–309.

Loveless: Am. Professional Pharmacist, October 1942, pages 631–640, page 639 is especially pertinent.

Kind et al.: J. of Immunology, 84, page 390, April 1960.